United States Patent [19]
Vivian

[11] 3,933,518

[45] Jan. 20, 1976

[54] COMPOSITIONS FOR REFLOWING ORGANIC SURFACES

[75] Inventor: Thomas A. Vivian, Midland, Mich.

[73] Assignee: The Dow Chemical Company, Midland, Mich.

[22] Filed: Dec. 19, 1974

[21] Appl. No.: 534,243

Related U.S. Application Data

[63] Continuation-in-part of Ser. No. 34,527, May 4, 1970, abandoned.

[52] U.S. Cl. ............... 106/311; 106/190; 252/171; 264/341
[51] Int. Cl.² .......................................... C08K 5/02
[58] Field of Search ..... 106/311; 252/171; 264/340, 264/341; 134/38

[56] References Cited
UNITED STATES PATENTS

| 2662837 | 12/1953 | Dunkin ............................... 134/29 |
| 2689198 | 9/1954 | Judd ................................... 134/30 |
| 2969328 | 1/1961 | Ellenson ............................ 252/153 |
| 3446890 | 5/1969 | Emery................................ 264/341 |
| 3536766 | 10/1970 | Mogford .......................... 260/652.5 |

*Primary Examiner*—Theodore Morris
*Attorney, Agent, or Firm*—Glywnn R. Baker

[57] ABSTRACT

Compositions containing 80 to 99 percent by volume of chlorinated aliphatic hydrocarbons and 1 to 20 percent by volume of an alkylene glycol alkanoate or an alkylene glycol ether alkanoate have been found to be excellent for use in the vapor reflow of organic surfaces.

4 Claims, No Drawings

COMPOSITIONS FOR REFLOWING ORGANIC SURFACES

CROSS REFERENCE TO RELATED APPLICATION

The present application is a continuation-in-part of my previous application Ser. No. 34,527 filed May 4, 1970 now abandoned.

BACKGROUND OF THE INVENTION

Various solvents and techniques have been used to reflow organic surfaces such as paint and thermoplastic polymers, see for example British Patent No. 1,165,176. The basic problem in reflow operations is the lack of a solvent or combination of solvents which easily reflows the surface and does not deleteriously affect the surface in the reflowing operation. To date most solvents known have drawbacks which adversely affect the reflowed surface in one or more ways. Some cause discoloration, some cause blooming, some form a haze, some cause crazing and some cause blistering. These problems are especially acute in the reflow organic surfaces with a minimum of these drawbacks, of course, are very desirable. Thus, an intensive search has been conducted to discover a solvent combination suitable for use in commercial production and repair.

SUMMARY OF THE INVENTION

According to the present invention, compositions containing about 80 to 99 percent by volume of chlorinated aliphatic hydrocarbon boiling at a temperature below about 200°C. and about 1 to about 20 percent by volume of an alkylene glycol alkanoate, an alkylene glycol ether alkanoate or mixture thereof boiling below about 200°C. have been discovered to be extremely useful solvent compositions for reflowing thermoplastic organic surfaces. In vapor reflow applications using the solvent compositions of the invention, fewer deleterious effects are observed than are exhibited by known compositions.

The chlorinated aliphatic hydrocarbon components of the composition may suitably be any of the normally liquid chlorinated hydrocarbons that are partial solvents for the organic surface to be reflowed boiling below 200°C. These chlorinated hydrocarbons usually have 1 to about 6 carbon atoms or more with 4 or less chlorine atoms attached to the hydrocarbon chain. Representative examples of various chlorinated aliphatic hydrocarbons suitable for use in the present invention include: chlorinated alkanes such as methylene chloride, chloroform, carbon tetrachloride, 1,1- and 1,2-dichloroethane, 1,1,1- and 1,1,2-trichloroethane, various trichloropropanes, tetrachloropropanes, tetrachlorobutanes, dichloropentanes and trichlorohexanes; and the chlorinated alkenes such as 1,2-cis- and trans-dichloroethene, trichloroethene, tetrachloroethene, trichloropropenes and tetrachlorobutenes. The preferred compositions of the present invention contain chlorinated alkanes, chlorinated alkenes or mixtures thereof having 1 to 3 carbon atoms and 1 to 4 chlorine atoms, with methylene chloride, 1,2-dichloroethane, 1,1,1- and 1,1,2-trichloroethane, 1,2-cis- and trans-dichloroethene, trichloroethene, and tetrachloroethene being especially preferred. Mixtures of methylene chloride and tetrachloroethene are of special interest in the present invention, with vapor reflow of compositions containing at least 50 percent by volume of methylene chloride being especially effective, and compositions containing 65 to 80 percent methylene chloride being of greatest interest.

Although the chlorinated aliphatic hydrocarbons may comprise 80 to 99 percent of the composition of the present invention, compositions containing 85 to 98 percent by volume of chlorinated hydrocarbons are preferred. The chlorinated hydrocarbons may be stabilized against reduction by metals with minor amounts of various stabilizers which are known in the art. Such stabilizers include propylene oxide, butylene oxide, dimethoxymethane and nitromethane. The use of stabilizers is especially preferred when methylene chloride is used in the vapor reflow composition.

The second essential component of the vapor reflow composition is the alkylene glycol alkanoate or alkylene glycol ether alkanoate. These compounds have a boiling point below 200°C. and preferably contain fewer than 10 carbon atoms. The glycol alkanoates have one or both of the glycol hydroxyls esterified, whereas the glycol ether alkanoates esterify one of the hydroxyls of the glycol and etherify the remaining hydroxyl of the glycol. Representative examples of suitable glycol alkanoates and glycol ether alkanoates include: glycol alkanoates, such as ethylene glycol mono or diacetate, ethylene glycol acetate propionate, ethylene glycol mono or dibutyrate, diethylene glycol mono or diacetate, triethylene glycol monopropionate, propylene glycol mono and diacetate, propylene glycol propionate acetate and butylene glycol mono or diacetate; and glycol ether alkanoates, such as ethylene glycol ethyl ether acetate, ethylene glycol pentyl ether acetate, ethylene glycol methyl ether acetate, ethylene glycol methyl ether propionate, ethylene glycol propyl ether acetate, ethylene glycol methyl ether butyrate, diethylene glycol ethyl ether acetate, propylene glycol ethyl ether acetate, propylene glycol methyl ether acetate, propylene glycol propyl ether acetate, propylene glycol methyl ether propionate, propylene glycol methyl ether butyrate, propylene glycol butyl ether acetate, butylene glycol ethyl ether acetate, butylene glycol methyl ether acetate, butylene glycol ethyl ether butyrate and butylene glycol butyl ether acetate. Preferred glycol alkanoates have alkanoyl groups of 2 to 4 carbon atoms. Preferred glycol ether alkanoates have in addition to the preferred alkanoyl group a preferred alkoxy group of 1 to 4 carbon atoms. Compositions containing the glycol ether alkanoates are of particular interest in the invention, with compositions containing ether alkanoates of ethylene glycol being especially preferred, and ethylene glycol ethyl ether acetate being of special interest.

As noted, the concentration of the glycol alkanoate or glycol ether alkanoate may range from about 1 to about 20 percent by volume. Although concentrations of glycol ester above 20 percent by volume may be employed, these solvents are not as good for vapor reflow as those containing less than 20 percent. Preferred concentrations of glycol alkanoates and glycol ether alkanoates are about 2 to about 15 percent by volume of the total reflow mixture.

Although these two components, the chlorinated aliphatic hydrocarbon and the glycol alkanoate or glycol ether alkanoate, are the only two mandatory components of the mixture, other components may be added to the mixture without deleteriously effecting the vapor reflow characteristics of the mixture. Such suitable additives may be picked from the known reflow solvents that have the characteristics as described above for the components of the present invention, viz. a boiling point below 200°C. and the property of being at least a partial solvent for the organic surface to be reflowed.

The vapor reflow compositions of the invention are simply prepared by mixing the individual components in the proportions specified and completely vaporizing the mixture or by mixing the vapors of the individual components in such proportions. The compositions are then suitably applied as a vapor preferably a superheated vapor, to any organic surface that is at least partially soluble in the composition to remove minor imperfections from localized areas or from the entire surface. The particular composition which is most suited to the organic surface varies as different surfaces and terminal characteristics are desired. Of the various thermoplastic organic surfaces that may be reflowed by the compositions of the invention, paints including lacquers and enamels, thermoplastic resins, such as polystyrene, polybutadiene, acrylonitrile-butadiene-styrene and similar substances are preferred, with the reflow of paint being of particular interest.

In the practical application of the invention to a localized surface of a painted metal, the various components of the ultimate vapor reflow composition are preferably vaporized and superheated or fed in the proper proportions through a mixing chamber and vaporized and superheated then fed into a passageway and projected on the painted surface. The vapor composition emitted from the passageway is contacted with the paint and the paint is reflowed. The vapor, being superheated, is at a condition that allows for rapid vaporization of the solvent from the treated surface. The surface is then allowed to dry. Imperfections in the painted surface are found to have been removed, leaving a surface which appears to be substantially identical to that of the surrounding area.

SPECIFIC EMBODIMENT

A vapor reflow composition containing 70 percent by volume of methylene chloride, 20 percent tetrachloroethene and 10 percent ethylene glycol ethyl ether acetate was prepared, vaporized at 200°C. and contacted with an aluminized acrylic lacquer painted on a car body. The paint was immediately reflowed in the localized area of contact and dried rapidly to give a surface almost identical to that of the surrounding area. No buffing or other post-treatment was required to improve the surface and make it acceptable by production standards.

In the same manner as shown by the example above, other vapor reflow solvents containing 80 to 99 percent of chlorinated aliphatic hydrocarbons and 1 to 20 percent of a glycol alkanoate, glycol ether alkanoate or mixture thereof may be employed to reflow paint or a thermoplastic toy to remove imperfections in the surface and to provide a surface when dried which is essentially the same as that of the surrounding area. Also in the same manner the entire surface may be reflowed to give little or no discoloration, haze, crazing or blistering.

Representative examples of compositions that give this desired result include those containing by volume: 60 percent methylene chloride, 30 percent 1,1,1-trichloroethane and 10 percent ethylene glycol diacetate; 65 percent methylene chloride, 30 percent 1,2-dichloroethene and 5 percent diethylene glycol methyl ether acetate; 75 percent methylene chloride, 23 percent trichloroethene and 2 percent propylene glycol propionate; 60 percent 1,2-dichloroethane, 30 percent tetrachloroethene and 10 percent butylene glycol methyl ether acetate; 50 percent 1,2,3-trichloropropane, 30 percent 1,2-dichloropentane and 20 percent ethylene glycol methyl ether acetate; and 85 percent methylene chloride and 15 percent ethylene glycol methyl ether propionate.

To demonstrate the effectiveness of the present invention a series of tests were run employing compositions of the present invention as well as some of those in the art. The results are reported hereinafter.

GENERAL PROCEDURE

Six four-by-five inch metal panels were obtained pre-painted from General Motors Corporation, each having a surface painted with an automobile top coat manufactured by E. I. duPont de Nemours Company.

Each panel was lightly sanded with 400 weight sandpaper on the lower portion and wiped clean with a soft dry cloth. Each so-scratched panel of each color was divided into four sections and a section subjected to the vapors of one of the compositions while the other three sections were protected by strips of masking tape. The vapors were generated by passing the liquid composition through a heated tube under pressure at a rate to convert the liquid to a superheated vapor having a temperature of about 325°F. at the spray nozzle of the tube. The panels were held about 4 inches from the nozzle and the panels were moved past the gun nozzle. Each panel was maintained in the vapor for about 1 second.

After the six panels of each color had been reflowed with each composition, the panels were visually rated from 1 to 3 for scratch removal, color and overall appearance of the reflowed area compared to the unreflowed area.

The following table sets forth the compositions employed and the results of visual ratings of the said Vivian.

| 20% C$_2$Cl$_4$<br>10% Ethylene Glycol<br>Ethyl Ether Acetate<br>70% CH$_2$Cl$_2$ (inhib.) | 50% CH$_2$Cl$_2$ (inhib.)<br>50%<br>1,1,1—Cl$_3$C$_2$H$_3$<br>(col. 7, lines 42–43) | 70% CH$_2$Cl$_2$ (inhib.)<br>30% Cl$_3$F$_3$C$_2$<br>(col. 4, lines 32–34) |
|---|---|---|
| Turquoise duPont Code 5-0481-6 | | |
| | 1 | 3 | 3 |
| Scratch Removal | Scratch marks removed | Scratch marks readily visible | Scratch marks readily visible |
| color | 2 Medium | 3 Low | 1 Color-good |
| Overall | 1 | 2 | 1 |
| Blue Firemist duPont Code 5-0487-6 | | |
| Scratch Removal | 1 Adequate | 1 | 1 |
| Color | 1 Best | 2 Next-best | 3 Poorest |
| Overall | 1 Best | 2 Next-best | 3 Poorest |
| Olive Green Fisher Code WA 3863 | | |
| Scratch Removal | 1 | 3 | 2 |
| Color | 1 | 2 | 1 |
| Overall | 1 | 3 | 2 |
| Gold Metallic duPont 6-0176-6 | | |
| Scratch Removal | 2 | 2 | 2 |
| Color | 1 | 3 | 2 |
| Overall | 1 | 3 | 2 |

-continued

| 20% $C_2Cl_4$<br>10% Ethylene Glycol Ethyl Ether Acetate<br>70% $CH_2Cl_2$ (inhib.) | 50% $CH_2Cl_2$ (inhib.)<br>50% $1,1,1-Cl_3C_2H_3$ (col. 7, lines 42–43) | 70% $CH_2Cl_2$ (inhib.)<br>30% $Cl_3F_3C_2$ (col. 4, lines 32–34) |
|---|---|---|
| Turquoise duPont Code 5-0481-6 | | |
| Gold Firemist duPont 4-0421-6 | | |
| Scratch Removal | 2 | 3 | 1 |
| Color | 1 | 2 | 3 |
| Overall | 1 | 2 | 3 |
| Scarlet Red Fisher Code WA 3804 | | |
| Scratch Removal | 1 | 3 | 3 Some Sagging |
| Color | 1 | 1 | 1 |
| Overall | 1 | 2 | 3 |

In another series of tests the following results were obtained.

GENERAL PROCEDURE

Twenty-eight four-by-eight inch metal panels, obtained from Parker Rust Roofing Division of Hooker Chemical Company, each having a bonderized surface, were primed with a grey automobile primer manufactured by E. I. duPont de Nemours Company. Each primed panel was baked at 225°F. for 15 minutes, then set aside to cool.

Each panel was lightly sanded with 600 weight sandpaper and wiped clean with a soft dry cloth.

The panels were coated with two coats of a thermoplastic acrylic automobile top coat, seven were coated with a gold colored top coat, seven were coated with a red colored top coat, seven were coated with a green colored top coat and seven with a black colored top coat. The top coats were commercially available compositions manufactured by E. I. duPont de Nemours or Inmont R&M.

Each panel was set aside after painting for at least two hours, then baked at 300°F. for 30 to 45 minutes. The so-baked panels were set aside for 24 hours.

Each panel was scratched on its painted surface lengthwise along one side one inch wide using a piece of 600 weight sandpaper.

One so-scratched panel of each color was subjected to the vapors of one of the compositions throughout about two-thirds of its length. The vapors were generated by passing the liquid composition through a heated tube under pressure at a rate to convert the liquid to a superheated vapor having a temperature of about 300°–350°F. at the spray nozzle of the tube. The panels were held about 4 inches from the nozzle so that about two-thirds of the panel was contacted with the vapors. Each panel was maintained in the vapor for about 1 second.

After the seven panels of each color had been reflowed, the panels were visually rated from 1 to 7 for gloss, haze and appearance of the interface of the reflowed area and the unreflowed area. The best panel overall of each color compared on a basis of 1 for the best to 7 for the poorest panel.

The following table sets forth the compositions employed and the results of independent visual ratings of a two-member rating panel noted as V and M, respectively.

TABLE OF RESULTS

| Composition, % by Volume | Gold V | Gold M | Red V | Red M | Black V | Black M | Green V | Green M |
|---|---|---|---|---|---|---|---|---|
| A. 20 Perchloroethylene<br>70 Methylene Chloride<br>10 Ethylene Glycol Ethyl Ether Acetate (Ethyl "Cellosolve" Acetate) EEA | 1 | 1 | Panel No. 1 each color<br>1 | 2 | 3 | 2/3* | 4 | 4 |
| B. Composition of Defensive Publication T872,012<br>90 Trichloroethylene<br>10 Ethylene Glycol Methyl Ether Acetate (MEA) | 6 | 7 | Panel No. 2 each color<br>7 | 7 | 5 | 3/4* | 5/7** Haze | 7 |
| C. Composition "B" MEA Replaced with EEA<br>90 Trichloroethylene<br>10 Ethylene Glycol Ethyl Ether Acetate | 4 | 6 | Panel No. 3 each color<br>6 | 6 | 6 | 6/6* | 5/7** Haze | 6 |
| D. Perchloroethylene Replacing Part of Trichloroethylene in "C"<br>70 Trichloroethylene<br>20 Perchloroethylene<br>10 Ethylene Glycol Ethyl Ether Acetate | 7 | 5 | Panel No. 4 each color<br>5 | 4 | 7 | 7/7* | 5/7** Haze | 5 |
| E. 60 Methylene Chloride<br>30 1,1,1-Trichloroethane<br>10 Ethylene Glycol Ethyl Ether Acetate | 5 | 4 | Panel No. 5 each color<br>3 | 3 | 2 | 5/5* | 3 | 1 |
| F. 80 Methylene Chloride<br>15 Perchloroethylene<br>5 Ethylene Glycol Ethyl Ether Acetate | 3 | 2 | Panel No. 6 each color<br>4 | 5 | 1 | 2/4* | 2 | 3 |
| G. 90 Methylene Chloride<br>10 Ethylene Glycol Ethyl Ether Acetate | 2 | 3 | Panel No. 7 each color<br>2 | 1 | 4 | 1/1* | 2 | 1 |

*The black panels were rated twice by one panel member, each rating being made after random ordering of the panels.
**These three panels were all rated hazy by one panel member and difficult to distinguish any significant degree of difference.

In still another test series the two following compositions were rated:
A. Methylene Chloride B. 99 percent Methylene Chloride 1 percent Ethylene Glycol Ethyl Ether Acetate Two panels were painted by an automotive body painter with a gold automotive lacquer and two panels with a red automotive lacquer and each baked for 30–45 minutes at 300°F. Each panel was scratched with 600 weight sandpaper and approximately one-half reflowed with one or the other of the above compositions. Three persons evaluated the panels reflowed with composition B as superior.

I claim:

1. A vapor reflow composition consisting essentially of about 80 to 99 percent of chlorinated aliphatic hydrocarbon boiling below about 200°C., and about 1 to 20 percent of an alkylene glycol alkanoate, alkylene glycol ether alkanoate or mixture thereof having a boiling point below about 200°C. and a stabilizing amount of propylene oxide, butylene oxide, dimethoxymethane, nitromethane or mixtures thereof.

2. The process for reflowing a thermoplastic organic surface comprising contacting the vaporized composition consisting essentially of about 80–99 percent of chlorinated aliphatic hydrocarbon boiling below 220°C., and about 1–20 percent of an alkylene glycol alkonate, alkylene glycol either alkonate or mixture thereof having a boiling point below about 200°C with the surface under conditions which allow for the rapid vaporization of the composition from the treated surface.

3. The process of claim 2 wherein the thermoplastic surface is paint.

4. The the process of claim 2 wherein the chlorinated aliphatic hydrocarbon consists of methylene chloride, 1,2-dichloroethane, 1,1,1- and 1,1,2-trichloroethane, 1,2-cis- and trans-dichloroethene, trichloroethene, tetrachloroethene, or a mixture thereof.

* * * * *

UNITED STATES PATENT AND TRADEMARK OFFICE
CERTIFICATE OF CORRECTION

PATENT NO. : 3,933,518
DATED : January 20, 1976
INVENTOR(S) : Thomas A. Vivian

It is certified that error appears in the above—identified patent and that said Letters Patent are hereby corrected as shown below:

On the first page under "References Cited", line [56], the first reference, "Dunkin" should read --Duncan--;

On the first page under "References Cited", line [56], the fourth reference, "Emery" should read --Emery et al.--;

Column 5, in the Table, line 8, "Turquoise duPont Code 5-0481-6" should be deleted;

Column 8, line 6, "alkonate" should read --alkanoate-- in both instances;

Column 8, line 6, "either" should read --ether--;

Column 8, line 14, the second "the" should be deleted.

Signed and Sealed this eighteenth Day of May 1976

[SEAL]

Attest:

RUTH C. MASON
*Attesting Officer*

C. MARSHALL DANN
*Commissioner of Patents and Trademarks*